Figures 1, 2:
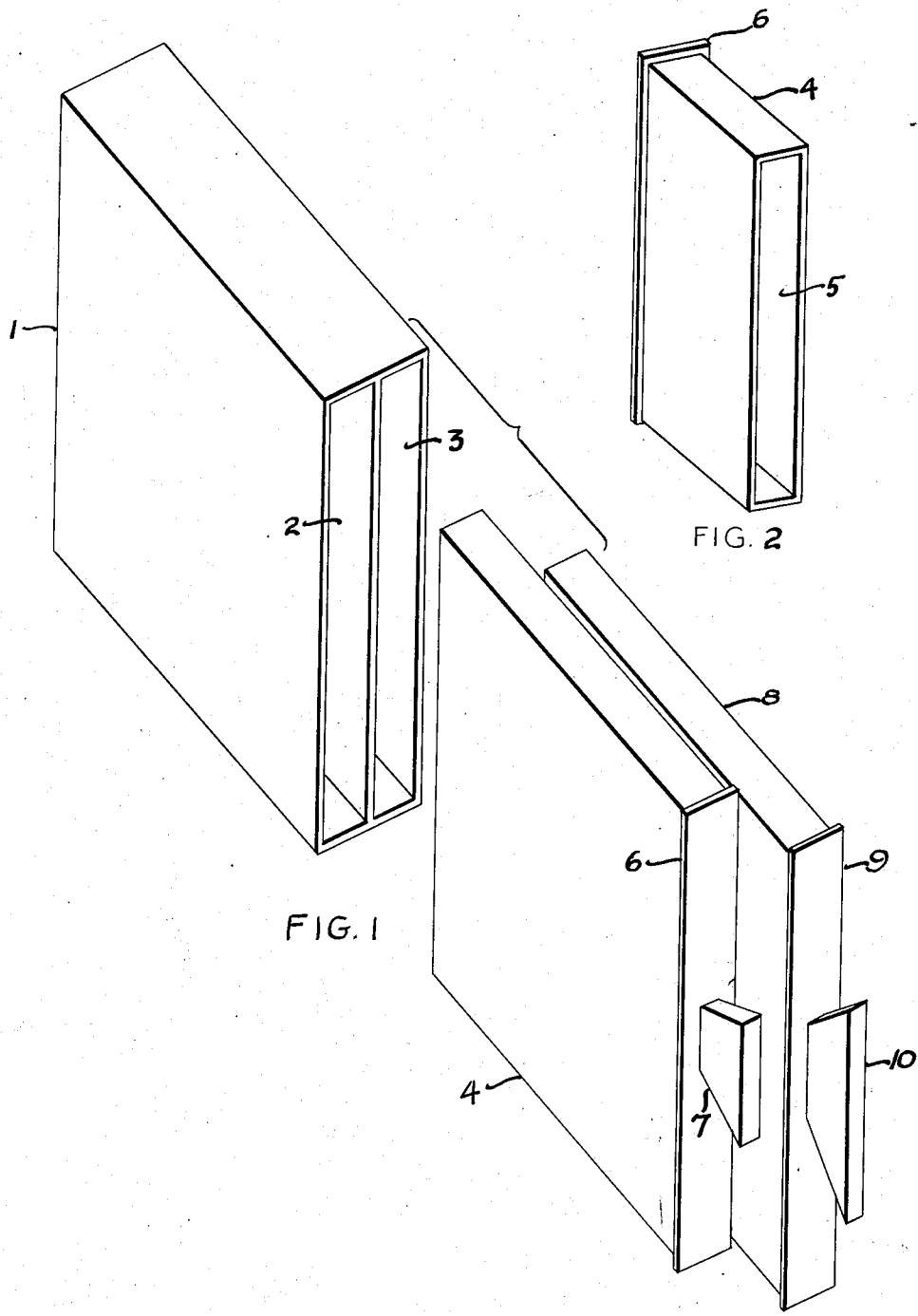

Nov. 11, 1952  C. D. SULLIVAN  2,617,699
HOLDER FOR CUT FILM
Filed April 30, 1948

WITNESS:
Harry D. Gaylord

INVENTOR:
Charles D. Sullivan
BY Eugene D. Farley ATTY.

Patented Nov. 11, 1952

2,617,699

UNITED STATES PATENT OFFICE 2,617,699

HOLDER FOR CUT FILM

Charles D. Sullivan, Portland, Oreg.

Application April 30, 1948, Serial No. 24,369

1 Claim. (Cl. 312—20)

The present invention relates to a holder for cut film, and more particularly pertains to a light-tight holder for the separate storage of unwrapped exposed and unexposed cut film while transporting the same from place to place.

It is present practice among photographers employing cut film to load their cameras with unexposed film in a dark room before starting upon a photographic tour. Extra unexposed film then is carried along, carefully wrapped in safety paper, and placed in boxes to protect it from the light. Extra wrappings and empty boxes also may be taken along in which to wrap and place the exposed film upon removing it from the camera.

After the film originally in the camera has been exposed, the photographer enters whatever dark room is available, which may be a makeshift facility such as a crowded clothes closet. There he removes the exposed film from his camera and replaces it with unexposed film. This may involve removing the unexposed film from one or more boxes and from three or more wrappings of safety paper and placing the desired quantity of unexposed film in the camera. The surplus, unexposed film then is wrapped and rewrapped in the safety paper and placed back in the box from which it was removed.

The exposed film which has been removed from the camera also must be wrapped and rewrapped in safety paper, and placed in a special box which has been brought along for the purpose. In addition to being time consuming and tedious, the foregoing procedure is subject to the disadvantage that where repeated loadings of the camera are to be made, there always exists the possibility that the boxes for exposed and unexposed film may be confused in the dark room, and that the film handled may be placed in the wrong box.

It therefore is a principal object of the present invention to provide a holder for cut film having provision for the separate and safe storage of unwrapped exposed and unexposed film.

It is a further principal object of the present invention to provide a holder for cut film having compartments for the separate storage of exposed and unexposed film, on which holder means are provided for distinguishing in the dark the compartments containing exposed film from those containing unexposed film.

It is a further object of the present invention to provide a holder for storing exposed and unexposed cut film which is of simple, inexpensive construction, of attractive appearance, and which is readily transportable.

The manner in which the foregoing and other objects of the invention are accomplished will be apparent from the following specification and claim considered together with the drawings wherein:

Figure 1 is a view in perspective of the film holder of the invention with the parts separated better to show its construction; and Figure 2 is a view in perspective of one of the film holding parts of the film holder of the invention, with its position reversed as compared with that in which it is shown in Figure 1, in order to illustrate the cavity or recess in which the film is contained.

As will be apparent from the drawings, the film holder of the present invention broadly comprises an outer container having therein a plurality of light-tight compartments, a plurality of drawers adapted to receive cut film and to fit one in each of the compartments and in light-sealing relationship thereto, each of said drawers having thereon means for identifying it in the dark.

Although the outer container 1 may be of varying size, shape and construction, it preferably has dimensions somewhat larger than those of the cut film which it is to contain and is made from any suitable constructional material, preferably a plastic. It may be divided into any desired number of compartments, there being two such compartments, 2 and 3 in the embodiment illustrated. In order to exclude light from the interior, the outer container as well as the drawers which it contains preferably are constructed from a black material, or have black surface coatings.

The drawers which are adapted to slide into the compartments of the outer container have shapes substantially conforming to the shape of the compartments by which they are to be received. Their size is such that they will fit snugly within the compartment, again for the obvious reason of excluding light from the interior. Each drawer is formed integrally, or the joints between the sections thereof are tightly sealed. One side only is open, this being the side which is adapted first to enter the appropriate compartment. The drawers, like the outer container, preferably are made from a black constructional material such as black plastic.

Thus the drawer 4 which is adapted to be received by the compartment 2 comprises a rectangular box-shaped member open at the rear side only, thereby providing a cavity or recess 5 which is designed to hold unwrapped cut film. The forward side 6 of the drawer preferably is made slightly larger than the cross-section of the drawer and also of the compartment into which the drawer fits. This provides a rim or flange which seals off the entrance to the compartment and prevents the access of light thereto.

On the front of the drawer, i. e. on that side presented to the exterior, are provided means for recognizing it in the dark, and hence for identifying its contents. Although such means may assume any form having tactile qualities, such as projections, depressions, patches and the like, they preferably comprise one or more projections of distinctive size and shape so as to be readily identifiable by the tactual sense. In the illustrated embodiment, such a projection is formed by the handle 7 on the face of the drawer, this handle being slightly smaller than that on the other drawer of the holder. It thus serves the dual functions of providing means for identifying the drawer as well as means for removing it from the compartment.

The drawer 8 adapted to be inserted into the compartment 3 is similar in size and shape to the drawer 4. It comprises five sides formed integrally with each other or closely fitted to each other and having toward the rear an open face affording access to the inner recess or cavity. The drawer is adapted to fit snugly within the recess 3 and has a front face 9 of slightly larger cross sections than that of either the drawer or the compartment into which the drawer fits, thus forming a flange which serves a light-sealing function. On the front face of the drawer is a handle 10 which is slightly larger than the handle 7 on drawer 4 and which affords means of identifying the drawer 8 and its contents as well as means for removing it from the compartment.

When using the film holder of the invention, the photographer may fill one of the drawers with a quantity of unwrapped, unexposed cut films, leaving empty the other drawer to provide storage space for film which has been exposed. After exposing all of the film in his camera, he retires to a dark room, removes the exposed film from his camera, and places it in the empty drawer of the film holder, which he recognizes by the size and shape of its handle. He then places this drawer again in its proper compartment. Next he removes the other drawer, i. e. that containing the unexposed film from the holder, takes out the desired amount of film, and loads his camera therewith. This drawer then is placed in its proper compartment, and the operation is completed. Use of the film holder of the invention thus provides a convenient means for transporting exposed and unexposed cut film and for handling it without inconvenience caused by the necessity of handling a multiplicity of safety wrappings and boxes. Furthermore, the film may be handled rapidly and expeditiously and without serious probability of confusing and mixing the exposed and unexposed film.

Having now described my invention in preferred embodiments, what I claim as new and desire to protect by Letters Patent is:

A film holder for the separate storage of exposed and unexposed cut film comprising an outer container of substantially rectangular cross-section, open on one side only and having therein a pair of compartments, a pair of separate drawers slidably received in the open side of said container, one in each of said compartments in light-sealing relationship thereto, one drawer being for exposed film and one for unexposed film, each of said drawers being closed on all sides except the side thereof opposite the outer end of the drawer, which side is open for the reception of film, the outer end of each of said drawers being provided with a peripheral flange dimensioned to overlie the open face of the compartment in which it is contained, and dissimilar handle means on the outer face of each drawer for identifying it in the dark as containing exposed or unexposed film, and for removing it from its respective compartment.

CHARLES D. SULLIVAN.

REFERENCES CITED

The following references are of record in the file of this patent:

UNITED STATES PATENTS

| Number | Name | Date |
|---|---|---|
| 391,751 | Kinnear | Oct. 23, 1888 |
| 469,122 | Buford | Feb. 16, 1892 |
| 633,318 | Horle | Sept. 19, 1899 |
| 1,121,459 | Blake | Dec. 15, 1914 |
| 1,133,889 | Smith | Mar. 30, 1915 |
| 1,510,599 | Martinez | Oct. 7, 1924 |
| 1,658,496 | Qvarnstrom | Feb. 7, 1928 |
| 2,196,293 | Dubas | Apr. 9, 1940 |